(12) United States Patent
Mercado

(10) Patent No.: US 11,576,514 B2
(45) Date of Patent: Feb. 14, 2023

(54) LEMON JUICING ASSEMBLY

(71) Applicant: Crispin Mercado, Bakersfield, CA (US)

(72) Inventor: Crispin Mercado, Bakersfield, CA (US)

( * ) Notice: Subject to any disclaimer, the term of this patent is extended or adjusted under 35 U.S.C. 154(b) by 343 days.

(21) Appl. No.: 16/936,485

(22) Filed: Jul. 23, 2020

(65) Prior Publication Data
US 2022/0022682 A1 Jan. 27, 2022

(51) Int. Cl.
*A47J 19/02* (2006.01)
*A47J 19/00* (2006.01)

(52) U.S. Cl.
CPC ............ *A47J 19/023* (2018.08); *A47J 19/005* (2013.01)

(58) Field of Classification Search
CPC ............................. A47J 19/023; A47J 19/005
See application file for complete search history.

(56) References Cited

U.S. PATENT DOCUMENTS

| | | |
|---|---|---|
| 574,413 A | 1/1897 | Graves |
| 587,860 A | 8/1897 | Remon |
| 1,305,339 A | 6/1919 | Bolton |
| 1,457,478 A | 6/1923 | Williams |
| 1,762,031 A * | 6/1930 | Roberts ............... A47J 19/06 100/234 |
| D468,975 S | 1/2003 | White |
| 6,739,056 B2 * | 5/2004 | Siegel ................. A47J 43/26 30/120.2 |
| 9,730,466 B1 * | 8/2017 | Schmieding ........ A47J 19/023 |
| 2013/0186289 A1 | 7/2013 | Garcia |
| 2019/0045829 A1 * | 2/2019 | Martinez Treviño ...................... A47J 19/023 |

FOREIGN PATENT DOCUMENTS

| WO | WO2007077417 | 7/2007 |
|---|---|---|
| WO | WO2007135216 | 11/2007 |

* cited by examiner

*Primary Examiner* — Omar Flores Sanchez

(57) ABSTRACT

A lemon juicing assembly for squeezing juice from a lemon includes a first lever that has a cup integrated therein to receive a lemon. A blade is fixed in the cup to slice the lemon when the lemon is urged downwardly in the cup. A second lever is pivotally coupled to the first lever and a plunger is integrated therein. The second lever is positionable in a closed position having the second lever lying on the first lever. Thus, the plunger compresses the lemon into the cup. In this way the lemon is sliced and the juice is squeezed from the lemon. The second lever is positionable in an open position having the second lever extending away from the first lever.

8 Claims, 4 Drawing Sheets

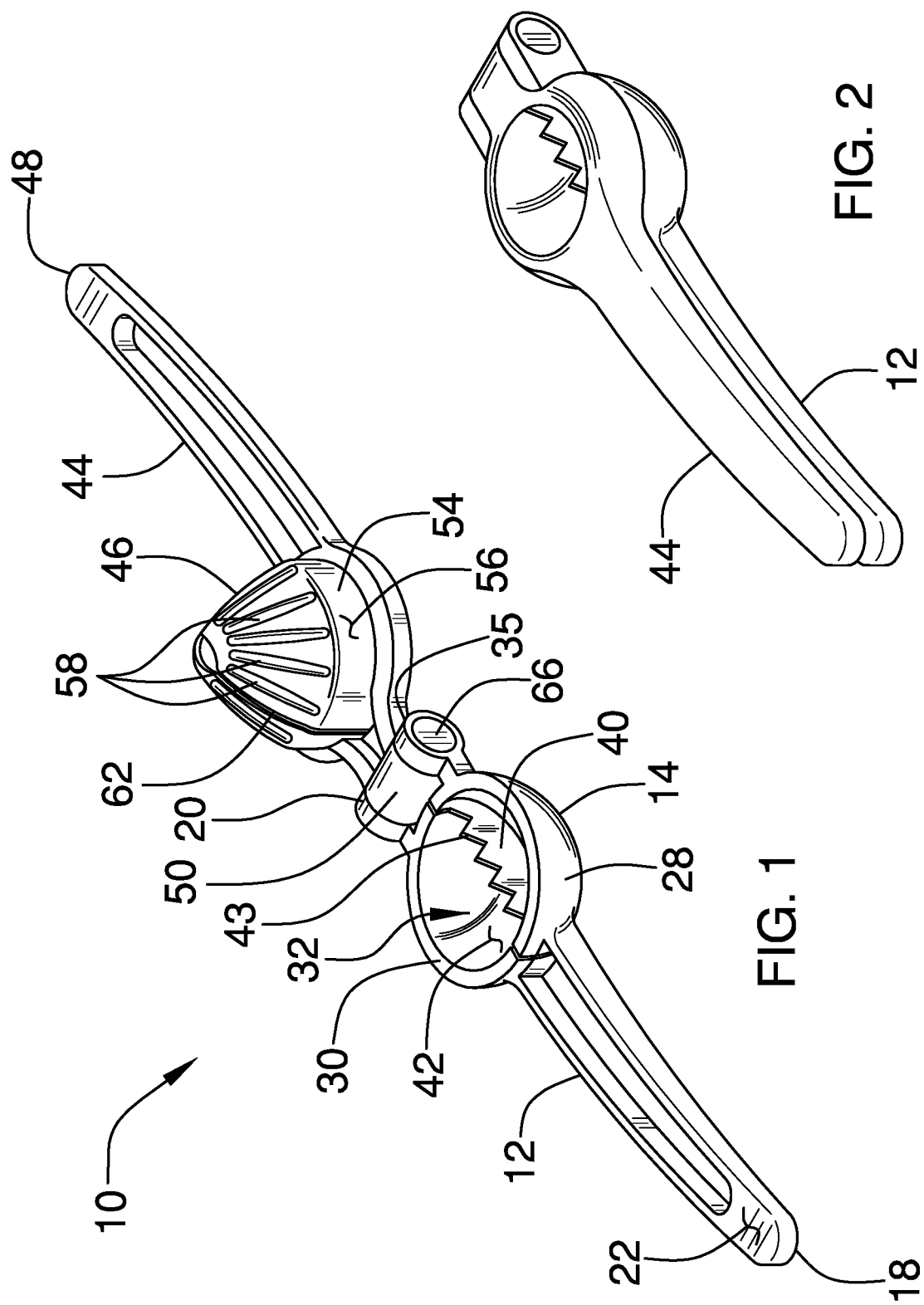

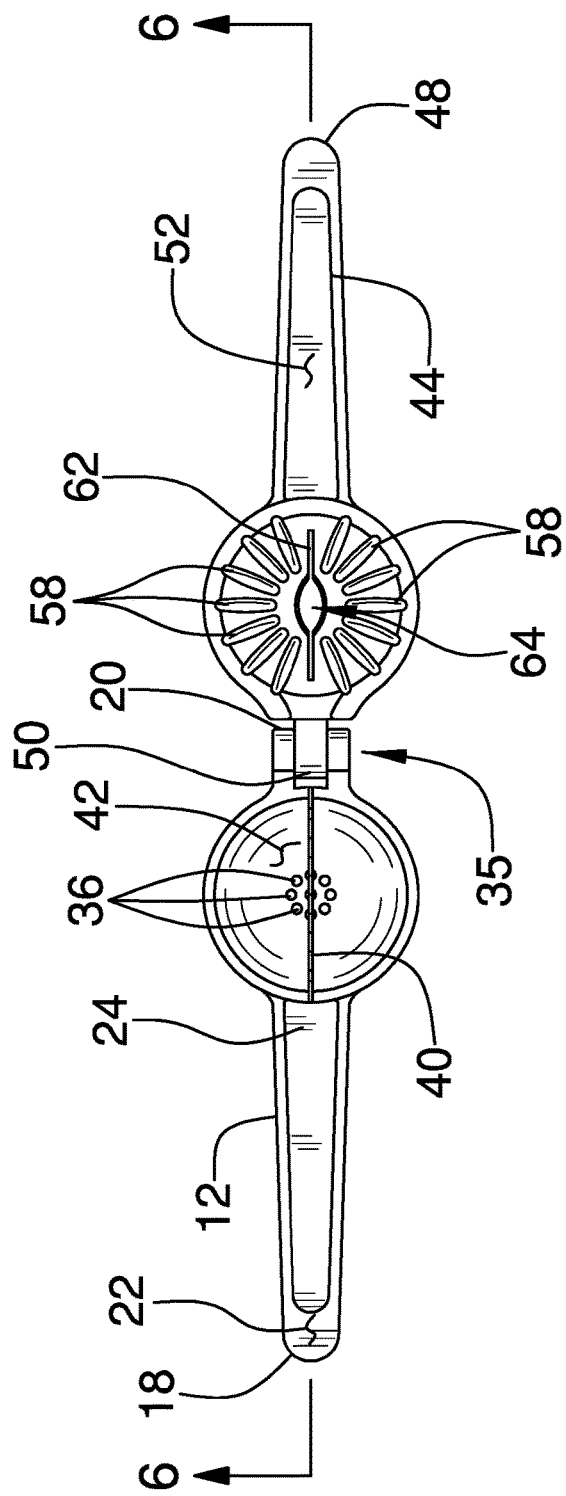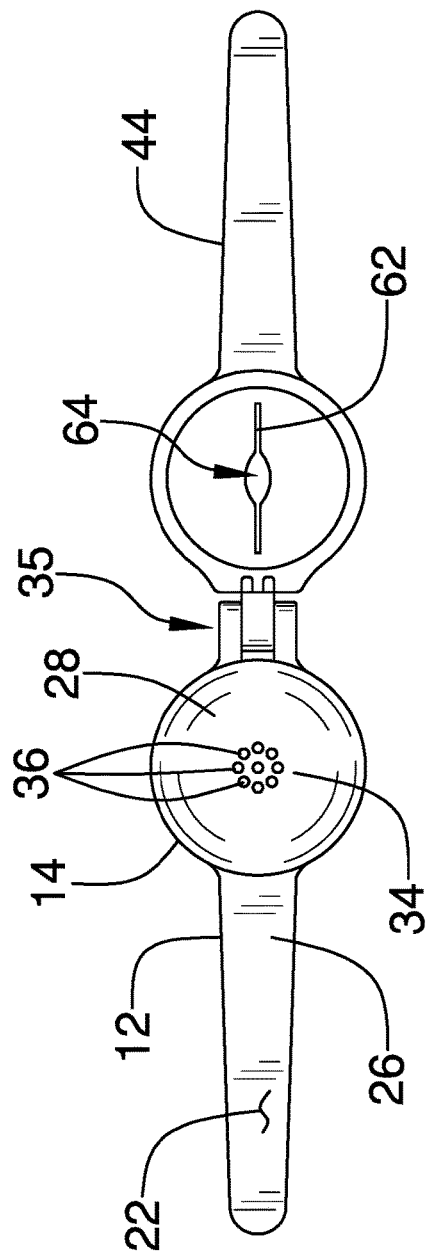

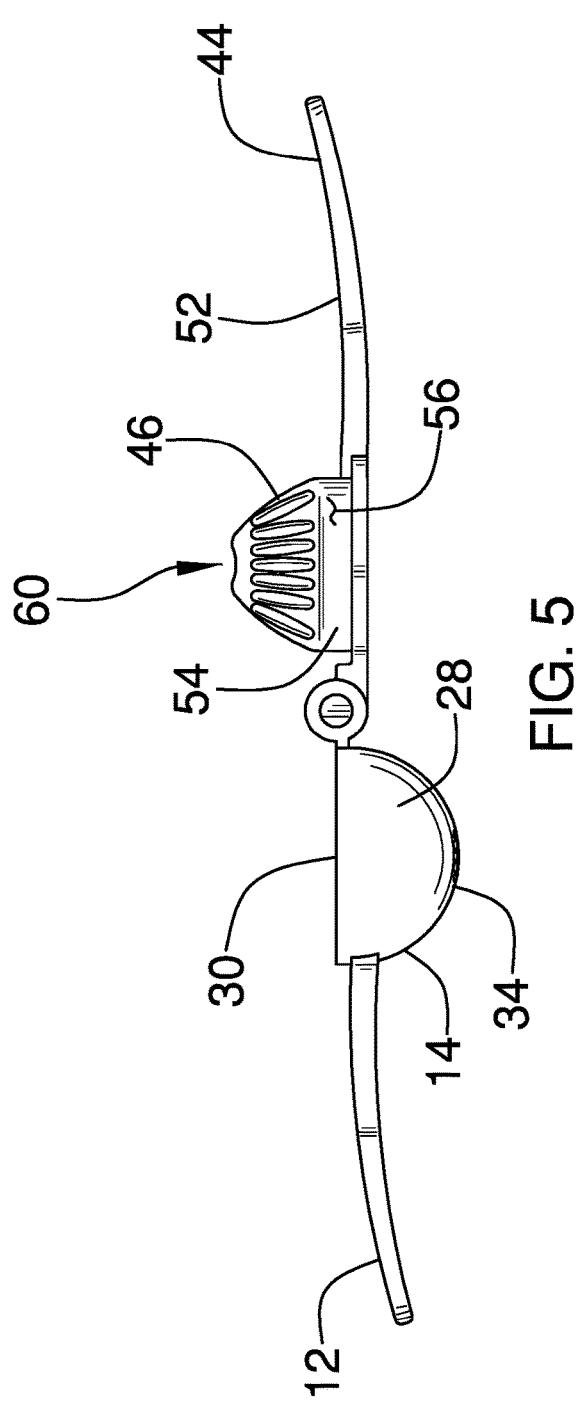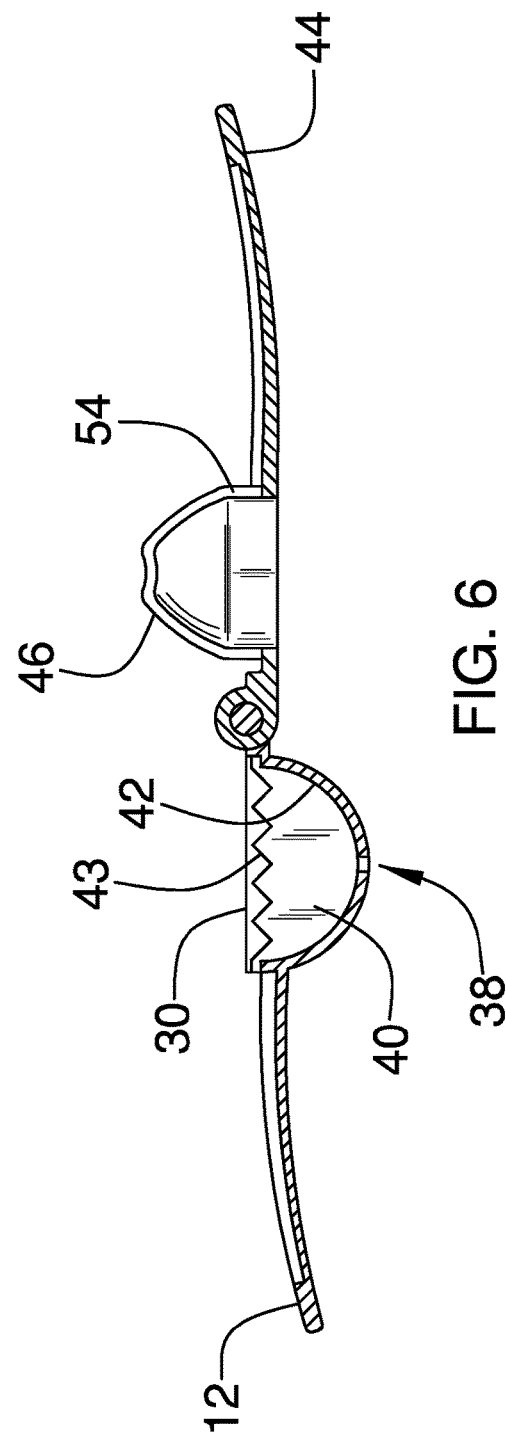

LEMON JUICING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to juicing devices and more particularly pertains to a new juicing device for simultaneously slicing a lemon and squeezing juice from the lemon.

(2) Description of Related Art Including Information Disclosed Under 37 CFR 1.97 and 1.98

The prior art relates to juicing devices including a lemon juicer which includes a blade on one side of a lever and a plunger on an opposite side of the lever from the blade. The prior art discloses a lemon juicer which includes a blade and a plunger and which is attachable to a support surface for stability. The prior art further discloses a lemon juicer which includes a first lever, a second lever and a third lever for slicing and squeezing a lemon. The prior art also discloses a lemon juicer which includes a first lever hingedly coupled to a second lever and a third lever extending laterally away from the second lever. The prior art discloses a lemon juicer that includes a plurality of blades and which is structured in a manner that requires reduced effort from a user to squeeze a lemon.

BRIEF SUMMARY OF THE INVENTION

An embodiment of the disclosure meets the needs presented above by generally comprising a first lever that has a cup integrated therein to receive a lemon. A blade is fixed in the cup to slice the lemon when the lemon is urged downwardly in the cup. A second lever is pivotally coupled to the first lever and a plunger is integrated therein. The second lever is positionable in a closed position having the second lever lying on the first lever. Thus, the plunger compresses the lemon into the cup. In this way the lemon is sliced and the juice is squeezed from the lemon. The second lever is positionable in an open position having the second lever extending away from the first lever.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a top perspective view of a lemon juicing assembly according to an embodiment of the disclosure showing a second lever in an open position FIG. 2 is a top perspective view of an embodiment of the disclosure showing a second lever in a closed position.

FIG. 3 is a top view of an embodiment of the disclosure.

FIG. 4 is a bottom view of an embodiment of the disclosure.

FIG. 5 is a left side view of an embodiment of the disclosure.

FIG. 6 is a cross sectional view taken along line 6-6 of FIG. 3 of an embodiment of the disclosure.

DETAILED DESCRIPTION OF THE INVENTION

Figure 7:
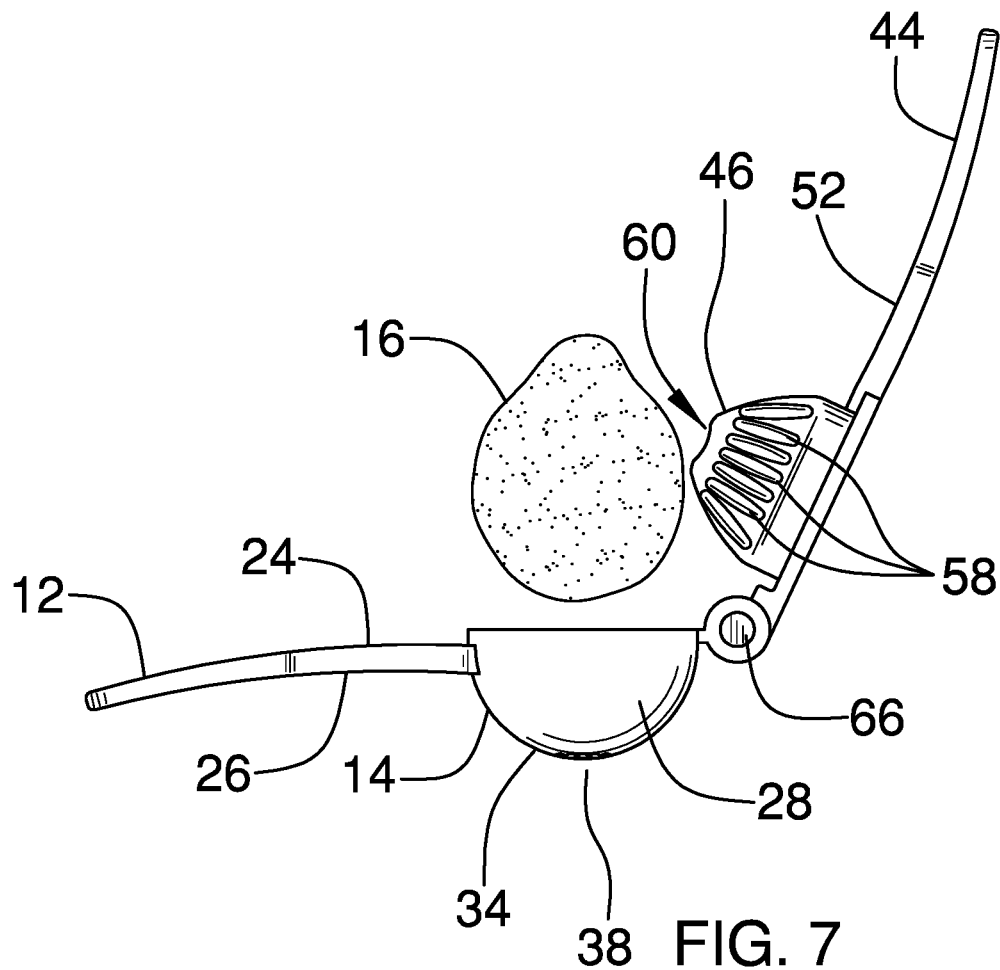
FIG. 7 is a perspective in-use view of an embodiment of the disclosure showing a lemon being inserted into a cup.
Figure 8:
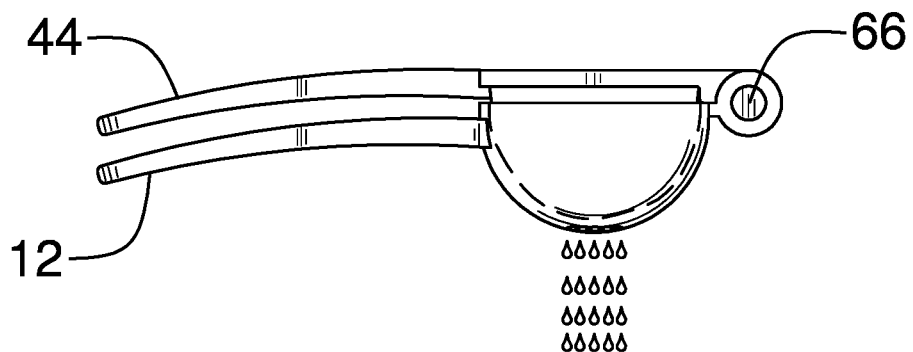
FIG. 8 is a perspective in-use view of an embodiment of the disclosure showing juice being squeezed from a lemon.

With reference now to the drawings, and in particular to FIGS. 1 through 8 thereof, a new squeezing device embodying the principles and concepts of an embodiment of the disclosure and generally designated by the reference numeral 10 will be described.

As best illustrated in FIGS. 1 through 8, the lemon juicing assembly 10 generally comprises a first lever 12 that has a cup 14 integrated therein to receive a lemon 16 or other fruit that is squeezed to produce juice. The first lever 12 has a first end 18, a second end 20 and an outer surface 22 extending therebetween, and the outer surface 22 has a top side 24 and a bottom side 26. The cup 14 has an outer wall 28 and an upper edge 30 defining an opening 32 into the cup 14. Additionally, the cup 14 is oriented such that the upper edge 30 lies on a plane that is coplanar with the top side 24 of the outer surface 22 of the first lever 12.

The outer wall 28 has a lower side 34 and the lower side 34 is spaced downwardly from the bottom side 26 of the outer surface 22 of the first lever 12. The cup 14 is positioned closer to the second end 20 than the first end 18 of the first lever 12, and the second end 20 is split into a yoke 35. The outer wall 28 has a plurality of holes 36 each extending therethrough to facilitate juice from the lemon 16, or other fruit, to pass therethrough. Each of the holes 36 is located on the lower side 34 of the outer wall 28 and each of the holes 36 is aligned with an apex 38 of the outer wall 28 with respect to the upper edge 30.

A blade 40 is fixed in the cup 14 and the blade 40 slices the lemon 16 when the lemon 16 is urged downwardly in the cup 14. In this way juice can be squeezed from the lemon 16 without requiring the lemon 16 to be cut or sliced beforehand. The blade 40 is coupled to an interior surface 42 of the outer wall 28 of the cup 14 and the blade 40 is coextensive with a center line of the cup 14. The blade 40 has a top edge 43 and the top edge 43 is spaced downwardly from the upper edge 30 of the outer wall 28 of the cup 14. Moreover, the top edge 43 is serrated and the top edge 43 is sharpened for enhancing slicing the lemon 16. The blade 40 is oriented collinear with a line extending between the first end 18 and the second end 20 of the first lever 12.

A second lever 44 is pivotally coupled to the first lever 12 and the second lever 44 has a plunger 46 integrated therein. The second lever 44 is positionable in a closed position having the second lever 44 lying on the first lever 12. In this way the plunger 46 compresses the lemon 16 into the cup 14 and onto the blade 40. The second lever 44 is positionable in an open position having the second lever 44 extending away from the first lever 12. The second lever 44 has a primary end 48, a secondary end 50 and a topmost surface 52 extending therebetween, and the secondary end 50 is pivotally coupled to the second end 20 of the first lever 12. The primary end 48 is aligned with the first end 18 of the first lever 12 when the second lever 44 is positioned in the closed position. Conversely, the second lever 44 extends away from the first lever 12 along a line that is coextensive with the line extending through the first end 18 and the second end 20 of the first lever 12 when the second lever 44 is in the open position.

The plunger 46 is positioned on the topmost surface 52 of the second lever 44 and the plunger 46 has an exterior wall 54 that is coupled to and extends upwardly from the topmost surface 52. The exterior wall 54 is concavely arcuate with respect to the topmost surface 52 such that the plunger 46 has a dome shape. The exterior wall 54 has an outermost surface 56 and the outermost surface 56 a plurality of depressions 58 each extending inwardly therein to enhance gripping the lemon 16. The plurality of depressions 58 extends from substantially between an apex 60 of the plunger 46 and the topmost surface 52. Moreover, the depressions 58 are spaced apart from each other and are distributed around a full circumference of the plunger 46.

The exterior wall 54 has a cut 62 extending therethrough and the cut 62 extends along a line extending between the primary end 48 and the secondary end 50 of the second lever 44. The blade 40 passes through the cut 62 when the second lever 44 is positioned in the closed position. The exterior wall 54 has an opening 64 extending therethrough, the opening 64 is aligned with the cut 62 and the opening 64 is aligned with the apex 60 of the plunger 46. Additionally, the secondary end 50 is positioned in the yoke 35 defined on the second end 20 of the first lever 12. A pin 66 extends through the yoke 35 defined on the first end 18 of the first lever 12 and the pine 66 engages the secondary end 50 of the second lever 44 such that the second lever 44 is pivotally retained on the first lever 12.

In use, the lemon 16, or other similarly sized fruit, is positioned in the cup 14 and the second lever 44 is urged into the closed position. In this way the plunger 46 compresses the lemon 16 onto the blade 40 to slice the lemon 16. Additionally, the lemon 16 is compressed into the cup 14 to squeeze the juice from the lemon 16 and the juice pours outwardly through the holes 36 in the outer wall 28 of the cup 14. Thus, the juice can be squeezed from the lemon 16 without requiring that the lemon 16 be cut or sliced prior to squeezing the juice from the lemon 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lemon juicing assembly for simultaneously cutting and squeezing a lemon to obtain lemon juice, said assembly comprising:
   a first lever having a cup being integrated therein wherein said cup is configured to receive a lemon;
   a blade being fixed in said cup wherein said blade is configured to slice the lemon when the lemon is urged downwardly in said cup; and
   a second lever being pivotally coupled to said first lever, second lever having a plunger being integrated therein, said second lever being positionable in a closed position having said second lever lying on said first lever wherein said plunger is configured to compress the lemon into said cup, said second lever being positionable in an open position having said second lever extending away from said first lever;
   wherein said first lever has a first end, a second end and an outer surface extending therebetween, said outer surface having a top side and a bottom side, said cup having an outer wall and an upper edge defining an opening into said cup, said cup being oriented such that said upper edge lies on a plane being coplanar with said top side of said outer surface of said first lever, said outer wall having a lower side, said lower side being spaced downwardly from said bottom side of said outer surface of said first lever, said cup being positioned closer to said second end than said first end of said first lever, said second end being split into a yoke; and
   wherein said blade is coupled to an interior surface of said outer wall of said cup, said blade being coextensive with a center line of said cup, said blade having a top edge, said top edge being spaced downwardly from said upper edge of said outer wall of said cup, said top edge being serrated, said top edge being sharpened for enhancing slicing the lemon, said blade being oriented collinear with a line extending between said first end and said second end of said first lever.

2. The assembly according to claim 1, wherein said outer wall has a plurality of holes each extending therethrough wherein each of said holes is configured to facilitate juice from the lemon to pass therethrough, each of said holes being located on said lower side of said outer wall, each of said holes being aligned with an apex of said outer wall with respect to said upper edge.

3. The assembly according to claim 1, wherein said second lever has a primary end, a secondary end and a topmost surface extending therebetween, said secondary end being pivotally coupled to said second end of said first lever, said primary end being aligned with said first end of said first lever when said second lever is positioned in said closed position, said second lever extending away from said first lever along a line being coextensive with said line extending through said first end and said second end of said first lever when said second lever is in said open position.

4. A lemon juicing assembly for simultaneously cutting and squeezing a lemon to obtain lemon juice, said assembly comprising:
 a first lever having a cup being integrated therein wherein said cup is configured to receive a lemon;
 a blade being fixed in said cup wherein said blade is configured to slice the lemon when the lemon is urged downwardly in said cup;
 a second lever being pivotally coupled to said first lever, second lever having a plunger being integrated therein, said second lever being positionable in a closed position having said second lever lying on said first lever wherein said plunger is configured to compress the lemon into said cup, said second lever being positionable in an open position having said second lever extending away from said first lever;
 wherein said first lever has a first end, a second end and an outer surface extending therebetween, said outer surface having a top side and a bottom side, said cup having an outer wall and an upper edge defining an opening into said cup, said cup being oriented such that said upper edge lies on a plane being coplanar with said top side of said outer surface of said first lever, said outer wall having a lower side, said lower side being spaced downwardly from said bottom side of said outer surface of said first lever, said cup being positioned closer to said second end than said first end of said first lever, said second end being split into a yoke;
 wherein said second lever has a primary end, a secondary end and a topmost surface extending therebetween, said secondary end being pivotally coupled to said second end of said first lever, said primary end being aligned with said first end of said first lever when said second lever is positioned in said closed position, said second lever extending away from said first lever along a line being coextensive with said line extending through said first end and said second end of said first lever when said second lever is in said open position; and
 wherein said plunger is positioned on said topmost surface of said second lever, said plunger having an exterior wall being coupled to and extending upwardly from said topmost surface, said exterior wall being concavely arcuate with respect to said topmost surface such that said plunger has an dome shape, said exterior wall having an outermost surface, said outermost surface a plurality of depressions each extending inwardly therein wherein said plurality of depressions is configured to enhance gripping the lemon, said plurality of depressions extending from substantially between an apex of said plunger and said topmost surface, said plurality of depressions being spaced apart from each other and being distributed around a full circumference of said plunger.

5. The assembly according to claim 4, wherein said exterior wall has a cut extending therethrough, said cut extending along a line extending between said primary end and said secondary end of said second lever, said blade passing through said cut when said second lever is positioned in said closed position, said secondary end being positioned in a yoke defined on a second end of said first lever.

6. The assembly according to claim 5, wherein said exterior wall has an opening extending therethrough, said opening being aligned with said cut, said opening being aligned with said apex of said plunger.

7. A lemon juicing assembly for simultaneously cutting and squeezing a lemon to obtain lemon juice, said assembly comprising:
 a first lever having a cup being integrated therein wherein said cup is configured to receive a lemon;
 a blade being fixed ire said up wherein said blade is configured to slice the lemon when the lemon is urged downwardly in said cup;
 a second lever being pivotally coupled to said first lever, second lever having a plunger being, integrated therein, said second lever being positionable in a closed position having said second lever lying on said first lever wherein said plunger is configured to compress the lemon into said cup, said second lever being positionable in an open position having said second lever extending away from said first lever;
 wherein said first lever has a first end, a second end and an outer surface extending therebetween, said outer surface having a top side and a bottom side, said cup having an outer wall and an upper edge defining an opening into said cup, said cup being oriented such that said upper edge lies on a plane being coplanar with said top side of said outer surface of said first lever, said outer wall having a lower side, said lower side being spaced downwardly from said bottom side of said outer surface of said first lever, said cup being positioned closer to said second end than said first end of said first lever, said second end being split into a yoke;
 wherein said second lever has a primary end, a secondary end and a topmost surface extending therebetween, said secondary end being pivotally coupled to said second end of said first lever, said primary end being aligned with said first end of said first lever when said second lever is positioned in said closed position, said second lever extending away from said first lever along a line being coextensive with said line extending through said first end and said second end of said first lever when said second lever is in said open position; and
 a pin extending through said yoke defined on said first end of said first lever and engaging said secondary end of said second lever such that said second lever is pivotally retained on said first lever.

8. The lemon juicing assembly according to claim 1, further comprising:
 said outer wall having a plurality of holes each extending therethrough wherein each of said holes is configured to facilitate juice from the lemon to pass therethrough, each of said holes being located on said lower side of said outer wall, each of said holes being aligned h an apex of said outer wall with respect to said upper edge,
 said second lever having a primary end, a secondary end and a topmost surface extending therebetween, said secondary end being pivotally coupled to said second end of said first lever, said primary end being aligned with said first end of said first lever when said second lever is positioned in said closed position, said second lever extending away from said first lever along a line being coextensive with said line extending through said first end and said second end of said first lever when said second lever is in said open position, said plunger being positioned on said topmost surface of said second lever, said plunger having an exterior wall being coupled to and extending upwardly from said topmost surface, said exterior wall being concavely arcuate with respect to said topmost surface such that said plunger has an dome shape, said exterior wall having an outermost surface, said outermost surface a plurality of depressions each extending inwardly therein wherein said plurality of depressions is configured to enhance gripping the lemon, said plurality of depressions extending from substantially between an apex of said plunger and said topmost surface, said plurality of depressions being spaced apart from each other and being distributed around a full circumference of said plunger, said exterior wall having a cut extending therethrough, said cut extending along a line extending between said primary end and said secondary end of said second lever, said blade passing through said cut when said second lever is positioned in said closed position, said exterior wall having an opening extending therethrough, said opening being aligned with said cut, said opening being aligned with said apex of said plunger, said secondary end being positioned in said yoke defined on said second end of said first lever; and a pin extending through said yoke defined on said first end of said first lever and engaging said secondary end of said second lever such that said second lever is pivotally retained on said first lever.

\* \* \* \* \*